US012644869B2

(12) United States Patent　　　　(10) Patent No.:　　US 12,644,869 B2
　　Yaeguchi　　　　　　　　　　　　　(45) Date of Patent:　　　　Jun. 2, 2026

(54) MODULE FOR LIQUID CHROMATOGRAPH, CONTROLLER, AND LIQUID CHROMATOGRAPH

(71) Applicant: SHIMADZU CORPORATION, Kyoto (JP)

(72) Inventor: Naoki Yaeguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 387 days.

(21) Appl. No.: 18/412,833

(22) Filed: Jan. 15, 2024

(65) Prior Publication Data

US 2024/0264130 A1　　Aug. 8, 2024

(30) Foreign Application Priority Data

Feb. 2, 2023　　(JP) ................................. 2023-014503

(51) Int. Cl.
　　*G01N 30/86*　　　　(2006.01)
　　*G01N 30/02*　　　　(2006.01)
(52) U.S. Cl.
　　CPC ... *G01N 30/8651* (2013.01); *G01N 2030/027* (2013.01)
(58) Field of Classification Search
　　USPC ....................................................... 73/61.52
　　See application file for complete search history.

(56) References Cited

U.S. PATENT DOCUMENTS

| 10,931,643 | B1 * | 2/2021 | Neumann | ................ | H04L 63/04 |
| 2011/0029445 | A1 * | 2/2011 | Whittacre | ................ | G09B 5/00 |
| | | | | | 705/317 |
| 2015/0112708 | A1 * | 4/2015 | Heniford | ................ | G16H 15/00 |
| | | | | | 705/2 |
| 2021/0190740 | A1 * | 6/2021 | Scolari | ................... | G01N 30/88 |
| 2024/0221875 | A1 * | 7/2024 | Andersson | ............. | G06Q 10/00 |

FOREIGN PATENT DOCUMENTS

| CN | 110114667 A | * | 8/2019 | ............. | G01N 33/58 |
| WO | 2020/183632 A1 | | 9/2020 | | |
| WO | WO-2022040804 A1 | * | 3/2022 | ............... | C07K 1/22 |

* cited by examiner

*Primary Examiner* — Walter L Lindsay, Jr.
*Assistant Examiner* — Warren K Fenwick
(74) *Attorney, Agent, or Firm* — Renner, Otto, Boisselle & Sklar, LLP

(57) ABSTRACT

A module (10-1 to 10-*n*) for a liquid chromatograph that is incorporated in a liquid chromatograph (1) and performs information communication with a controller (20) of the liquid chromatograph (1). The module (10-1 to 10-*n*) includes an assignment requesting part (MF1) configured to transmit, when the module is an unassigned module (10-*n*) that is a module to which an identifier for communication with the controller (20) is not assigned, an assignment request for the identifier for automatically assigning the identifier to the controller (20) only when request permission is given.

9 Claims, 4 Drawing Sheets

ASSIGNMENT OF CONNECTION ADDRESS
AS VIEWED FROM MODULE 1

ASSIGNMENT OF CONNECTION ADDRESS
AS VIEWED FROM MODULE 2

CONNECT TO CONTROLLER

201 REQUEST PERMISSION IS GIVEN FROM REQUEST PERMISSION GIVING PART

202 TRANSMIT ASSIGNMENT REQUEST

203 DISPLAY THAT ASSIGNMENT IS BEING EXECUTED

204 IS ASSIGNMENT COMPLETED?
No
Yes

205 DISPLAY THAT ASSIGNMENT IS NOT BEING EXECUTED

END

ASSIGNMENT OF CONNECTION ADDRESS
AS VIEWED FROM CONTROLLER

MODULE FOR LIQUID CHROMATOGRAPH, CONTROLLER, AND LIQUID CHROMATOGRAPH

BACKGROUND OF THE INVENTION

1. Field of the Invention

The present invention relates to a module having a part of a function of a liquid chromatograph, a controller that manages operation of each module in the liquid chromatograph, and the liquid chromatograph.

2. Description of the Related Art

There is a liquid chromatograph including one or more modules and a controller that comprehensively manages operation of the modules (see WO 2020/183632 A). Modules of the liquid chromatograph include a liquid feeding pump, an autosampler, a column oven, a detector, and the like, and each module is connected to a controller by a unique communication line.

In order for the controller to identify each module and perform communication individually, it is necessary to set an identifier (connection address) for each module. In an analysis device such as a liquid chromatograph, it is common to manually set an identifier of each module.

SUMMARY OF THE INVENTION

In a liquid chromatograph, a real-time communication environment is required to obtain reproducibility of a chromatogram, and communication between a controller and each module needs to be completed within fixed time of several milliseconds. For this reason, there is a problem that, when a module independently performs communication with the controller, this interferes with communication between the controller and another module, a collision of communication data is generated, communication cannot be completed within fixed time, and real-time property is impaired. For this reason, the controller has served as an administrator of a bus to manage a voice of each module, and the controller communicates with each part with a set of setting and response sequentially.

It is complicated to manually set an identifier of each module. For this reason, it is also conceivable to automatically set an identifier of each module by using a DHCP function used in a general-purpose communication technique such as Ethernet. However, when a DHCP function is simply applied to an analysis device, a client (module) independently performs broadcast communication for searching for a DHCP server to which an identifier is assigned. Then, when a new module is connected to a controller for some reason during analysis, the module newly connected to the controller requests the server to assign an identifier. As a result, communication between another module and the controller is hindered, waiting time is generated in data communication, and there is a possibility that reproducibility of a chromatogram cannot be obtained.

The present invention has been made in view of the above problem, and an object of the present invention is to prevent hinderance of information communication between a controller and another device while automating assignment of an identifier to a module connected to the controller.

A module according to the present invention is a module for a liquid chromatograph that is incorporated in a liquid chromatograph and performs information communication with a controller of the liquid chromatograph. The module includes an assignment requesting part configured to transmit, when the module is an unassigned module that is a module to which an identifier for communication with the controller is not assigned, an assignment request for the identifier for automatically assigning the identifier to the controller only when request permission is given.

A controller according to the present invention is a controller for a liquid chromatograph that performs information communication with an assigned module that is a module to which an identifier is assigned.

The controller includes:

a server part for automatically assigning the identifier to an unassigned module in response to an assignment request from the unassigned module, the unassigned module being a module to which the identifier is not assigned; and a request permission part that gives request permission for execution of assignment of an identifier to the unassigned module, and in a case where the unassigned module is present, assignment of an identifier to the unassigned module by the server part is executed only when the request permission is given from the request permission part to the unassigned module.

An analysis device according to the present invention is an analysis device including one or more modules and a controller that performs information communication with an assigned module that is the module to which an identifier is assigned, wherein the controller includes:

a server part for automatically assigning an identifier to an unassigned module in response to an assignment request from the unassigned module, the unassigned module being the module to which no identifier is assigned; and a request permission part that monitors a communication state of the controller and gives request permission to the unassigned module only in a time zone in which the controller does not perform communication, the module includes:

an assignment requesting part configured to execute an assignment request for the identifier to the server part only when the request permission is given from the controller when the module itself is the unassigned module, and in a case where the unassigned module is present, assignment of an identifier to the unassigned module is executed only in a time zone in which the controller is not performing communication.

Since a module according to the present invention is configured not to transmit an assignment request for an identifier unless request permission is given from the outside if the module is an unassigned module, the module does not automatically transmit an assignment request for an identifier to the controller while a liquid chromatograph performs analysis or the like. By the above, it is possible to prevent hinderance of information communication between a controller and another device while automating assignment of an identifier to a module connected to the controller.

In a case where an unassigned module is present, the controller according to the present invention is configured to give request permission to the unassigned module only in a time zone in which the controller does not perform communication, and assignment of an identifier to the unassigned module is executed only when the controller gives request permission to the unassigned module, so that information communication between the controller and another device can be prevented from being hindered while assignment of an identifier to the unassigned module is automated.

The liquid chromatograph according to the present invention includes the module and the controller described above, so that assignment of an identifier to an unassigned module is executed only when analysis is not performed, and the like. Accordingly, it is possible to prevent hinderance of information communication between the controller and another device while automating assignment of an identifier to the unassigned module.

DETAILED DESCRIPTION OF THE INVENTION

Hereinafter, an embodiment of a module, a controller, and a liquid chromatograph according to the present invention will be described.

Figure 1:
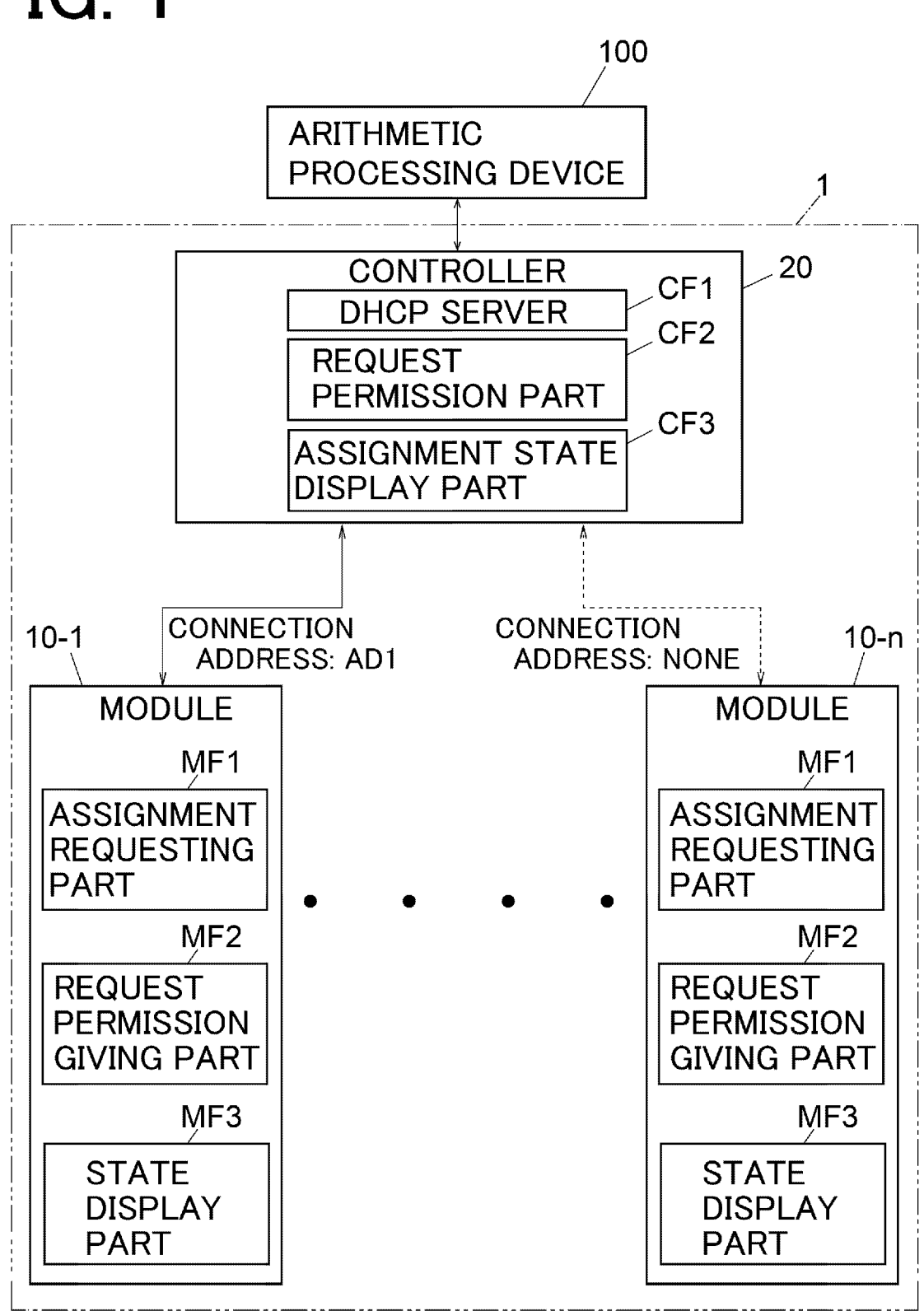
FIG. 1 is a block diagram illustrating an embodiment of a liquid chromatograph.

FIG. 1 illustrates a schematic configuration of an analysis system. This analysis system includes a liquid chromatograph 1 and an arithmetic processing device 100. The arithmetic processing device 100 is a computer device (for example, a personal computer) equipped with dedicated software for managing operation of the liquid chromatograph 1 and performing arithmetic processing of analysis data acquired by the liquid chromatograph 1.

The liquid chromatograph 1 includes one or more modules 10-1 to 10-n and a controller 20. An example of the liquid chromatograph 1 is a liquid chromatograph, and examples of the modules 10-1 to 10-n include a liquid feeding pump, an autosampler, a column oven, a detector, and the like. Each of the modules 10-1 to 10-n is connected to the controller 20 by an individual communication line. The controller 20 is realized by a computer circuit including a central processing part (CPU), an information storage memory, and the like. The arithmetic processing device 100 communicates with the controller 20 and transmits information such as an analysis schedule and an analysis condition of each piece of analysis to the controller 20. The controller 20 controls operation of a module in a communicable state based on information given from the arithmetic processing device 100. Further, analysis data obtained by the liquid chromatograph 1 is transmitted from the controller 20 to the arithmetic processing device 100.

A connection address, which is an individual identifier, is automatically assigned to the modules 10-1 to 10-n connected to the controller 20 by a communication line by a DHCP function, and a module to which a connection address is assigned (also referred to as assigned module) can perform mutual information communication with the controller 10. In FIG. 1, the module 10-1 is an assigned module to which a connection address AD1 is assigned, and the module 10-n is an unassigned module to which a connection address is not yet assigned. As will be described later, the controller 20 is equipped with a DHCP server CF1 (server part) which is a function of automatically assigning a connection address to the unassigned module 10-n in response to an assignment request from the unassigned module 10-n.

The controller 20 includes the DHCP server CF1, a request permission part CF2, and an assignment state display part CF3.

The DHCP server CF1 is a function of automatically assigning a connection address to the unassigned module 10-n in response to an assignment request from the unassigned module 10-n.

The request permission part CF2 is a function of giving permission (hereinafter, request permission) to transmit an assignment request to the unassigned module 10-n. The request permission part CF2 monitors a state of the controller 20, and transmits a request permission notification to the unassigned module 10-n only in a case where the controller 20 is in a state of not performing information communication (in particular, broadcast communication) with another module or the arithmetic processing device 100. Conversely, when the controller 20 is performing information communication with any device, a request prohibition notification is transmitted to the unassigned module 10-n.

The assignment state display part CF3 is a function of displaying whether or not assignment of a connection address to the unassigned module 10-n is being executed. Examples of a function of the assignment state display part CF3 include a function of turning on an LED lamp provided on an outer surface of a housing of the controller 20 only during execution of assignment, and a function of displaying that assignment is being executed on a display mounted on the controller 20.

Each of the modules 10-1 to 10-n includes an assignment requesting part MF1, a request permission giving part MF2, and a state display part MF3.

The assignment requesting part MF1 is a function of requesting the DHCP server CF1 of the controller 10 to assign a connection address. The assignment requesting part MF1 is configured to execute an assignment request for a connection address to the DHCP server CF1 only when request permission is given.

The request permission giving part MF2 is a function for the user to directly give request permission to the assignment requesting part MF1. The request permission giving part MF2 is realized by, for example, a request permission button provided on an outer surface of a housing of the modules 10-1 to 10-n. In this case, the assignment requesting part MF1 is configured to determine that request permission is given when a request permission button is pressed, and transmit an assignment request for a connection address to the DHCP server CF1. Note that an aspect of the request permission giving part MF2 is not limited to this.

The state display part MF3 is a function of displaying whether or not assignment of a connection address with the DHCP server CF1 is being executed. Examples of a function of the state display part MF3 include a function of turning on an LED lamp provided on an outer surface of a housing of each of the modules 10-1 to 10-n only during execution of assignment of a connection address.

In this embodiment, since the controller 20 is equipped with the request permission part CF2, a request permission is given to the unassigned module 10-2 in a time zone in which the controller 20 does not perform information communication with another device, so that a connection address can be assigned to the unassigned module 10-*n* without hinderance of information communication between the controller 20 and another device. However, there may be a case where a controller as a connection destination of a module is connected is not equipped with the request permission part CF2. In this case, since no request permission is given from the controller to the assignment requesting part MF1, the assignment requesting part MF1 does not operate, and a situation where a connection address needs to be manually set is generated. If each of the modules 10-1 to 10-*n* includes the request permission giving part MF2, even if a controller as a connection destination does not include the request permission part CF2, the user can give request permission to the assignment requesting part MF1 at an appropriate timing (for example, a timing at which the liquid chromatograph 1 is not executing analysis), so that automatic assignment of a connection address to the unassigned module 10-*n* by a DHCP function can be realized. Conversely, if the module 10-*n* is connected to the controller 20 including the request permission part CF2, the function of the request permission giving part MF2 is unnecessary. Therefore, as a preferable aspect, the configuration may be such that the function of the request permission giving part MF2 is disabled in a case where a controller as a connection destination includes the request permission part CF2, and the function of the request permission part MF2 is enabled only when a controller as a connection destination does not include the request permission part CF2.

Here, an example of assignment of a connection address will be briefly described. When request permission is given to the unassigned module 10-*n*, the assignment requesting part MF1 of the module 10-*n* transmits an assignment request to the DHCP server CF1 of the controller 20. The DHCP server CF1 that receives the assignment request proposes a connection address that can be assigned to the unassigned module 10-*n* to the assignment requesting part MF1. When the assignment requesting part MF1 that receives the proposal of a connection address requests the DHCP server CF1 to permit use of the proposed connection address and the DHCP server CF1 gives use permission to the assignment requesting part MF1, the connection address is set as a connection address of the module 10-*n*.

Note that an address set for a module is reset when power of the module is turned off. For this reason, assignment of a connection address is executed each time power of a module is turned on.

Figure 2:
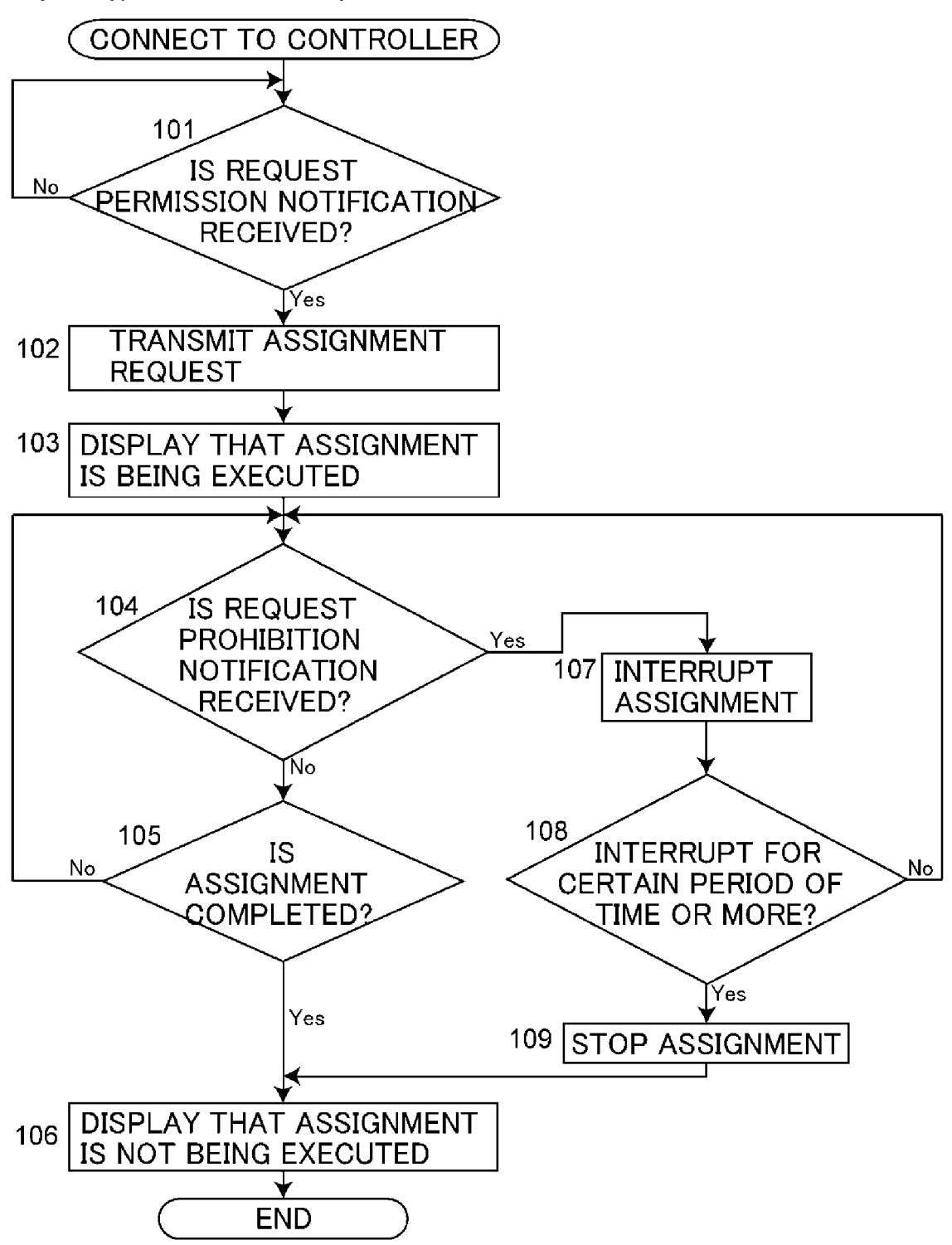
FIG. 2 is a flowchart for describing an example of assignment of an identifier to an unassigned module connected to a controller including a request permission part as viewed from the unassigned module.

Next, an example of assignment of a connection address as seen from the module 10-*n* connected to the controller 20 including the request permission part CF2 will be described with reference to FIG. 1 and a flowchart of FIG. 2.

When the module 10-*n* is connected to the controller 20, the assignment requesting part MF1 of the module 10-*n* receives a request permission notification from the request permission part CF2 of the controller 20 and transmits an assignment request to the DHCP server CF1 (Steps 101 and 102). By the above, assignment of a connection address to the module 10-*n* is started between the assignment requesting part MF1 and the DHCP server CF1. At this time, the state display part MF3 displays that assignment of a connection address is being executed by turning on an LED lamp on an outer surface of a housing of the module 10-*n* or the like (Step 103).

When assignment of a connection address to the module 10-*n* is completed (Step 105), the state display part MF3 displays that assignment of a connection address is not being executed by turning off an LED lamp on an outer surface of a housing of the module 10-*n* or the like (Step 106). On the other hand, when the assignment requesting part MF1 receives a request prohibition notification from the request permission part CF2 before assignment of a connection address to the module 10-*n* is completed (Step 104), the assignment requesting part MF1 interrupts the assignment being executed (Step 107). When a request permission notification is received from the request permission part CF2 within a certain period of time after interruption of the assignment, the assignment of a connection address between the assignment requesting part MF1 and the DHCH server CF1 is resumed, but when the interruption of the assignment continues for a certain period of time, the assignment of a connection address is stopped (Step 109). Also in this case, the state display part MF3 displays that assignment is not being executed (Step 106).

Figure 3:
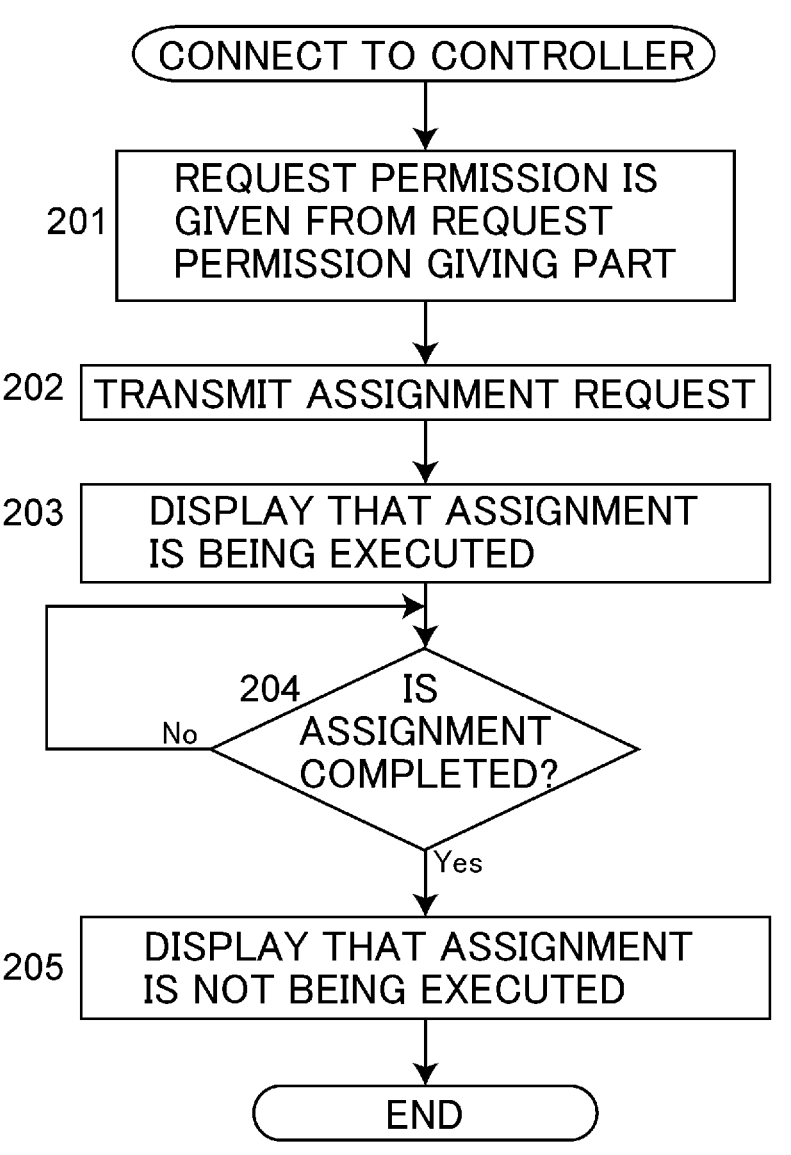
FIG. 3 is a flowchart for describing an example of assignment of an identifier to an unassigned module connected to the controller not including the request permission part as viewed from the unassigned module.

Next, an example of assignment of a connection address as seen from the module 10-*n* connected to a controller not including the request permission part CF2 will be described with reference to FIG. 1 and a flowchart of FIG. 3.

After the module 10-*n* is connected to a controller not including the request permission part CF2, when request permission is given from the request permission giving part MF2 to the assignment requesting part MF1 as a request permission button provided on an outer surface of a housing of the module 10-*n* is pressed or the like (Step 201), the assignment requesting part MF1 transmits a request for assigning a connection address to the module 10-*n* to the DHCP server CF1 (Step 202). By the above, assignment of a connection address to the module 10-*n* is started between the assignment requesting part MF1 and the DHCP server CF1. At this time, the state display part MF3 displays that assignment of a connection address is being executed (Step 203). After that, when the assignment of a connection address to the module 10-*n* is completed (Step 204), the state display part MF3 displays that the assignment is not being executed (Step 205).

Figure 4:
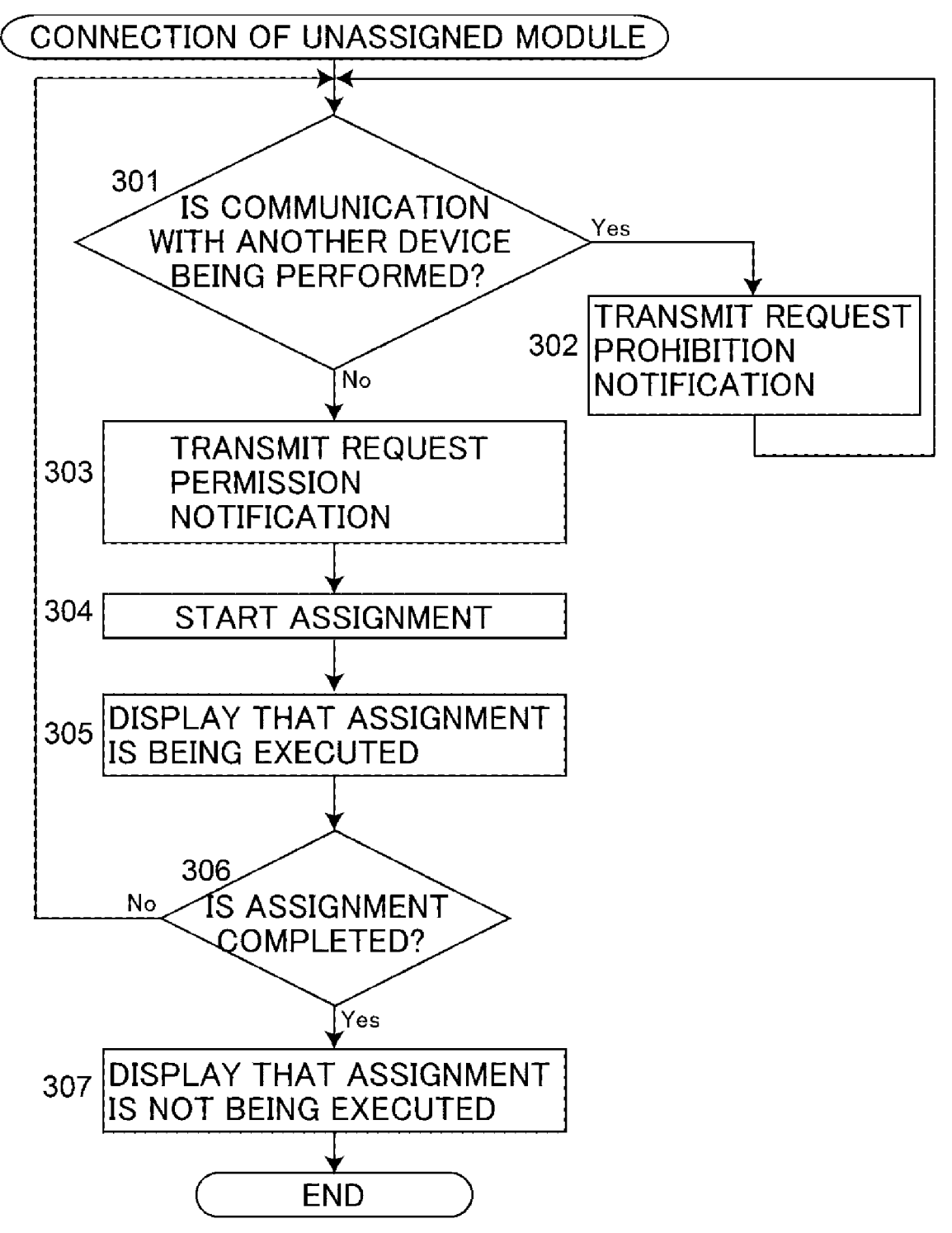
FIG. 4 is a flowchart for describing an example of assignment of an identifier to an unassigned module as viewed from the controller.

Next, an example of assignment of a connection address as seen from the controller 20 including the request permission part CF2 will be described with reference to FIG. 1 and a flowchart of FIG. 4.

When the module 10-*n* is connected to the controller 20, the request permission part CF2 checks whether or not the controller 20 is performing information communication with another device, and if the information communication is not performed (Step 301: No), transmits a request permission notification to the module 10-*n* (Step 303). On the other hand, when the controller 20 is performing information communication with another device (Step 301: Yes), the request permission part CF2 transmits a request prohibition notification to the module 10-*n* (Step 302).

After the request permission part CF3 transmits a request permission notification, when an assignment request is transmitted from the module 10-*n* to the controller 20, assignment of a connection address to the module 10-*n* is started between the DHCP server CF1 and the assignment requesting part MF1 of the module 10-*n* (Step 304). At this time, the assignment state display part CF3 displays that assignment of a connection address is being executed, for example, by turning on an LED lamp provided on an outer surface of a housing of the controller 20 (Step 305). After that, when the assignment of a connection address to the module 10-*n* is completed (Step 306: Yes), the assignment state display part CF3 turns off the LED lamp on the outer surface of the housing of the controller 20 or the like to display that the assignment of a connection address is not being executed (Step 307).

The embodiment described above is merely an example of an embodiment of a module, a controller, and a liquid chromatograph according to the present invention. The embodiment of the module, the controller, and the liquid chromatograph according to the present invention is as described below.

An embodiment of a module according to the present invention is a module for a liquid chromatograph that is incorporated in a liquid chromatograph and performs information communication with a controller of the liquid chromatograph. The module includes an assignment requesting part configured to transmit, when the module is an unassigned module that is a module to which an identifier for communication with the controller is not assigned, an assignment request for the identifier for automatically assigning the identifier to the controller only when request permission is given.

In aspect [1] of the above embodiment of the module, the module includes a request permission giving part for the user to give the request permission to the assignment requesting part, and the assignment requesting part is configured to transmit the assignment request when the request permission is given through the request permission giving part (MF2). According to this aspect, since an assignment request to the controller can be transmitted from the module at a timing desired by the user, it is possible to avoid a timing at which the controller performs information communication with another device, such as while a liquid chromatograph performs analysis.

In the above aspect [1], the request permission giving part may be a request permission button provided on an outer surface of a housing of the module, and the assignment requesting part (MF1) may be configured to determine that the request permission is given when the request permission button is pressed.

Further, in an aspect [2] of the above embodiment of the module, the assignment requesting part is configured to transmit the assignment request only when the request permission is given from the controller. This aspect [2] assumes that the controller has a function of checking its own state and permitting execution of assignment request to an unassigned module at such a timing that information communication with another device is not hindered. According to this aspect [2], since assignment of an identifier to an unassigned module is executed only at a timing at which information communication between the controller and another device is not hindered, automatic assignment of an identifier to the unassigned module can be realized without hinderance of communication between the controller and another device.

Further, an aspect [3] of the above embodiment of the module further includes a state display part that performs display indicating a state in which assignment of an identifier to the module is being executed. According to such an aspect, the user can easily recognize that assignment of an identifier to the module newly connected to the controller is performed.

An embodiment of a controller according to the present invention is a controller for a liquid chromatograph that performs information communication with an assigned module that is a module to which an identifier is assigned.

The controller includes:

a server part for automatically assigning the identifier to an unassigned module in response to an assignment request from the unassigned module, the unassigned module being a module to which the identifier is not assigned; and a request permission part that gives request permission for execution of assignment of an identifier to the unassigned module, and in a case where the unassigned module is present, assignment of an identifier to the unassigned module by the server part is executed only when the request permission is given from the request permission part to the unassigned module.

The above embodiment of the controller may include an assignment state display part indicating that the server is executing assignment of the identifier to the unassigned module. In this way, the user can easily recognize that assignment of an identifier to the module newly connected to the controller is performed.

Further, in the above embodiment of the controller, the request permission part may be configured to give the request permission only when the liquid chromatograph is not being analyzed.

An embodiment of a liquid chromatograph according to the present invention is a liquid chromatograph including an assigned module that is a module to which an identifier is assigned and a controller that performs information communication with the assigned module.

The controller includes:

a server part for automatically assigning an identifier to an unassigned module in response to an assignment request from the unassigned module, the unassigned module being a module to which no identifier is assigned; and a request permission part that gives request permission for execution of assignment of an identifier to the unassigned module, the module includes:

an assignment requesting part configured to transmit an assignment request for the identifier to the server part only when the request permission is given from the controller when the module is the unassigned module, and in a case where the unassigned module is present, assignment of an identifier to the unassigned module is executed only when the request permission is given from the controller to the unassigned module.

DESCRIPTION OF REFERENCE SIGNS 1 liquid chromatograph
10-1 to 10-$n$ module
20 controller
100 arithmetic processing device
MF1 assignment requesting part
MF2 request permission giving part
MF3 state display part
CF1 DHCP server
CF2 request permission part
CF3 assignment state display part

What is claimed is:

1. A module for a liquid chromatograph that is incorporated in a liquid chromatograph and performs information communication with a controller of the liquid chromatograph, the module comprising:

an assignment requesting part configured to transmit, when the module is an unassigned module that is a module to which an identifier for communication with the controller is not assigned, an assignment request for the identifier for automatically assigning the identifier to the controller only when request permission is given.

2. The module according to claim 1, wherein the module includes a request permission giving part for a user to give the request permission to the assignment requesting part, and the assignment requesting part is configured to transmit the assignment request when the request permission is given through the request permission giving part.

3. The module according to claim 2, wherein the request permission giving part is a request permission button provided on an outer surface of a housing of the module, and the assignment requesting part is configured to determine that the request permission is given when the request permission button is pressed.

4. The module according to claim 1, wherein the assignment requesting part is configured to transmit the assignment request only when the request permission is given from the controller.

5. The module according to claim 1, further comprising a state display part that performs display indicating a state in which assignment of the identifier to the module is being executed.

6. A controller for a liquid chromatograph that performs information communication with an assigned module that is a module to which an identifier is assigned, the controller comprising:

a server part for automatically assigning the identifier to an unassigned module in response to an assignment request from the unassigned module, the unassigned module being a module to which the identifier is not assigned; and a request permission part that gives request permission for execution of assignment of an identifier to the unassigned module, wherein in a case where the unassigned module is present, assignment of an identifier to the unassigned module by the server part is executed only when the request permission is given from the request permission part to the unassigned module.

7. The controller according to claim 6, further comprising an assignment state display part indicating that the server is executing assignment of the identifier to the unassigned module.

8. The controller according to claim 6, wherein the request permission part is configured to give the request permission only when the liquid chromatograph is not being analyzed.

9. A liquid chromatograph including one or more modules and a controller that performs information communication with an assigned module that is the module to which an identifier is assigned, wherein the controller includes:

a server part for automatically assigning an identifier to an unassigned module in response to an assignment request from the unassigned module, the unassigned module being a module to which no identifier is assigned; and a request permission part that gives request permission for execution of assignment of an identifier to the unassigned module, the module includes:

an assignment requesting part configured to transmit an assignment request for the identifier to the server part only when the request permission is given from the controller when the module is the unassigned module, and in a case where the unassigned module is present, assignment of an identifier to the unassigned module is executed only when the request permission is given from the controller to the unassigned module.

* * * * *